United States Patent [19]
Gu-pin et al.

[11] Patent Number: 5,894,346
[45] Date of Patent: Apr. 13, 1999

[54] BIOLOGICAL TESTING MICROSCOPE

[75] Inventors: Gu Gu-pin, Zhenjiang Jiangsu; Gu Ai-ping, Zhenjiang; Chen Li-chao, Zhenjiang; Xu qing, Zhenjiang, all of China

[73] Assignee: Tradek Ltd., Woodbridge, Canada

[21] Appl. No.: 08/892,637

[22] Filed: Jul. 15, 1997

[51] Int. Cl.$^6$ .................. G01N 21/01; G01N 21/29; G02B 27/02

[52] U.S. Cl. .................. 356/244; 422/82.05; 359/801; 359/804

[58] Field of Search .................. 359/801, 804, 359/823, 699, 700, 701; 356/244; 422/85.05

[56] References Cited

U.S. PATENT DOCUMENTS

| | | | |
|---|---|---|---|
| 3,582,181 | 6/1971 | Delores | 359/823 |
| 3,656,840 | 4/1972 | Smith et al. | 359/804 |
| 5,267,087 | 11/1993 | Weidemann | 359/801 |
| 5,572,370 | 11/1996 | Cho | 359/801 |
| 5,639,424 | 6/1997 | Rausnitz | 422/61 |

Primary Examiner—Robert Kim
Assistant Examiner—Zandra V. Smith
Attorney, Agent, or Firm—Baker & Daniels

[57] ABSTRACT

A portable testing device for examining biological samples in one embodiment comprises a support and a tubular member having a lens holder adjacent one end thereof rotatably mounted on the support. A light source is moveable axially within the tubular member between an on position where the light source is illuminated and an off position. A biological sample support surface is provided adjacent the lens holder on which a biological sample to be examined is placed. A lens through which a user can look to examine a biological sample placed on the biological sample support surface is removably supported by the lens holder. The light source and tubular member carry co-operating formations which are configured such that the light source moves axially within the tubular member upon rotation of the tubular member. In another embodiment the light source is stationary and is responsive to a light-sensitive circuit.

22 Claims, 3 Drawing Sheets

BIOLOGICAL TESTING MICROSCOPE

FIELD OF THE INVENTION

The present invention relates to medical testing equipment and in particular to a portable biological sample testing device.

BACKGROUND OF THE INVENTION

During health examinations, it is often necessary to examine blood samples, urine samples etc. in order to diagnose a patient. To-date, specialized equipment has been used to analyze biological samples of this nature. This specialized equipment is large and extremely expensive making it suitable for use only in large institutions such as for example hospitals.

The rise in living standards of people and escalating health-care costs has led to an increase in the desire for people to perform their own self-examinations prior to seeking professional help. Unfortunately, the nature of existing equipment to analyze biological samples, has to-date, made self-examinations of biological samples impossible.

It is therefore an object of the present invention to provide a novel portable biological sample testing device.

SUMMARY OF THE INVENTION

According to one aspect of the present invention there is provided a portable testing device for examining biological samples comprising:
a support;
a first tubular member having a lens holder adjacent one end thereof;
a light source within said first tubular member and actuable between on and off conditions;
a biological sample support surface within said first tubular member on which a biological sample to be examined is placed; and
a lens removably supported by said lens holder through which a user can look to examine a biological sample placed on said biological sample support surface.

In one embodiment, the first tubular member is rotatably mounted on the support and the light source is moveable axially within the first tubular member between the on and off conditions. The light source and first tubular member carry co-operating formations configured to move axially the light source upon rotation of the first tubular member.

Preferably, the co-operating formations are in the form of a spiral groove formed in one of the first tubular member and light source and a projection on the other of the first tubular member and light source. In the preferred embodiment, the spiral groove is formed in an inner surface of the first tubular member.

Preferably, the biological sample testing device further comprises a second tubular member coaxial with the first tubular member and disposed between the light source and the first tubular member. The second tubular member is fixedly mounted on the support and has a longitudinal slot therein through which the projection passes. The light source is moveable axially within the second tubular member. In a preferred embodiment, the slot narrows in width intermediate its opposed ends.

Preferably, the lens is axially adjustable within the lens holder to adjust the focus thereof and includes an interior surface which constitutes the biological sample support surface.

In a second embodiment, the light source is stationary within the first tubular member. A light-sensitive circuit is provided in the biological sample testing device to actuate the light source between the on and off conditions.

According to another aspect of the present invention there is provided a portable testing device for examining biological samples comprising:
an outer enclosed casing constituted by a pair of separable shell members;
a stationary inner tubular member within said casing and having a longitudinally extending slot therein;
a power supply adjacent one end of said inner tubular member;
a lens holder adjacent an opposite end of said inner tubular member;
an outer tubular member surrounding said inner tubular member, said outer tubular member being rotatable with respect to said inner tubular member;
a light source moveable axially within said inner tubular member between an illuminated on position where said light source is in electrical contact with said power supply and an off position where said light source is electrically isolated from said power supply;
a biological sample support surface on which a biological sample to be examined is placed; and
a lens removably supported by said lens holder through which a user can look to examine a biological sample placed on said biological sample support surface, wherein one of said light source and outer tubular member carries a projection extending through said slot and the other of said light source and outer tubular member carries a spiral groove therein accommodating said projection, said projection being moveable along said groove and slot to move axially said light source within said inner tubular member upon rotation of said outer tubular member.

According to yet another aspect of the present invention there is provided a portable testing device for examining biological samples comprising:
an outer enclosed casing constituted by a pair of separable shell members;
an inner tubular member within said casing;
a power supply adjacent one end of said inner tubular member;
a lens holder adjacent an opposite end of said inner tubular member;
a light source within said inner tubular member and actuable between an illuminated on position where said light source is electrically connected to said power supply and an off position where said light source is electrically isolated from said power supply;
a light-sensitive circuit to actuate said light source between said on and off conditions;
a biological sample support surface on which a biological sample to be examined is placed; and
a lens removably supported by said lens holder through which a user can look to examine a biological sample placed on said biological sample support surface.

The present invention provides advantage in that the biological sample testing device is small making it easy and convenient to carry and is of a simple construction making it inexpensive to manufacture. Also, the biological sample testing device is easy to operate and reliable allowing virtually anyone to examine a biological sample.

BRIEF DESCRIPTION OF THE DRAWINGS

Embodiments of the present invention will now be described more fully with reference to the accompanying drawings in which.

3

Figure 1:
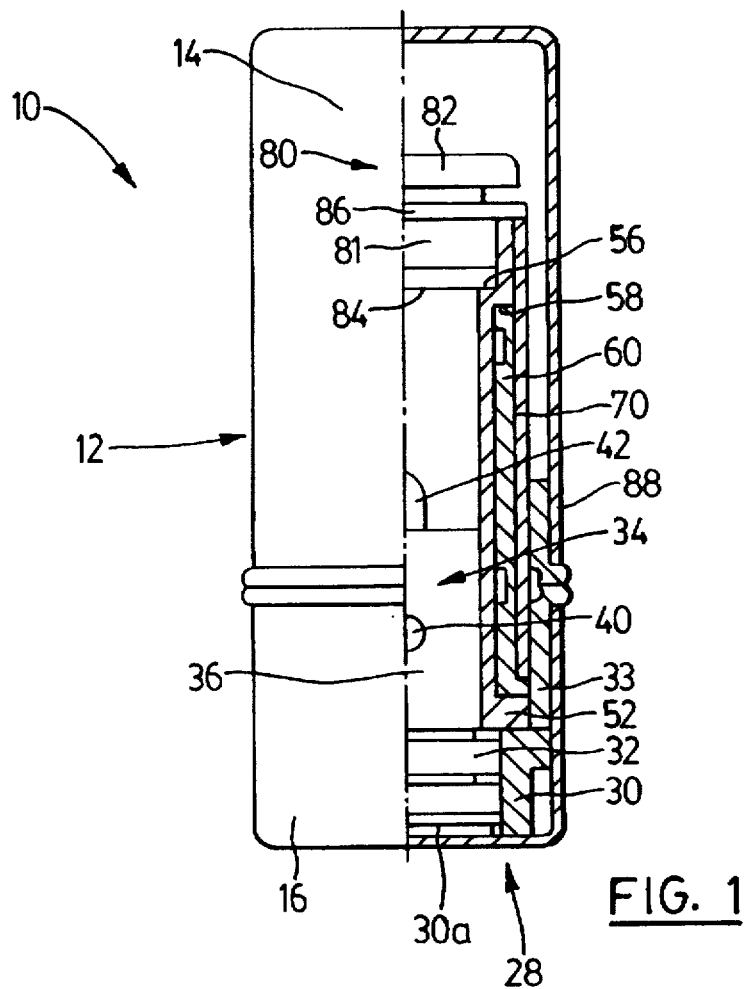
FIG. 1 is a side elevational view, partly cut-away, of a biological sample testing device in accordance with the present invention.
Figure 2:
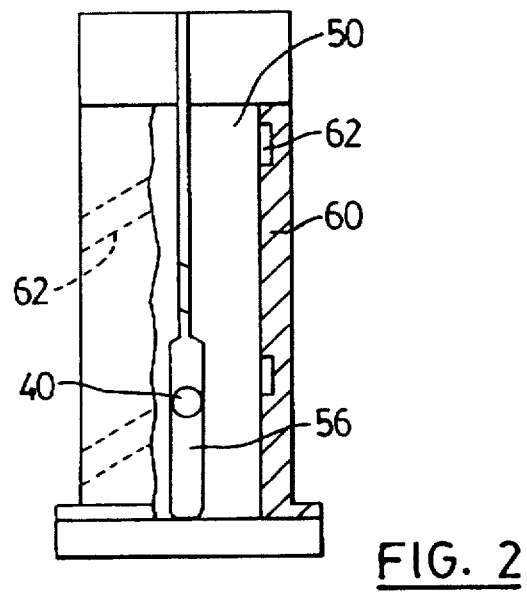
Figure 3C:
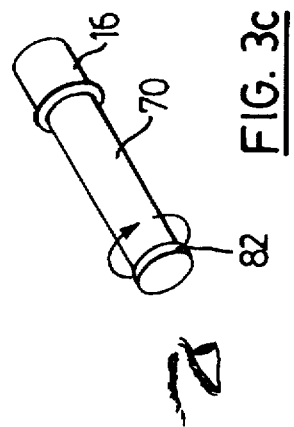
Figure 3B:
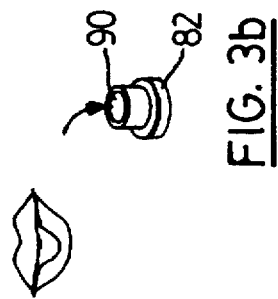
Figure 3A:
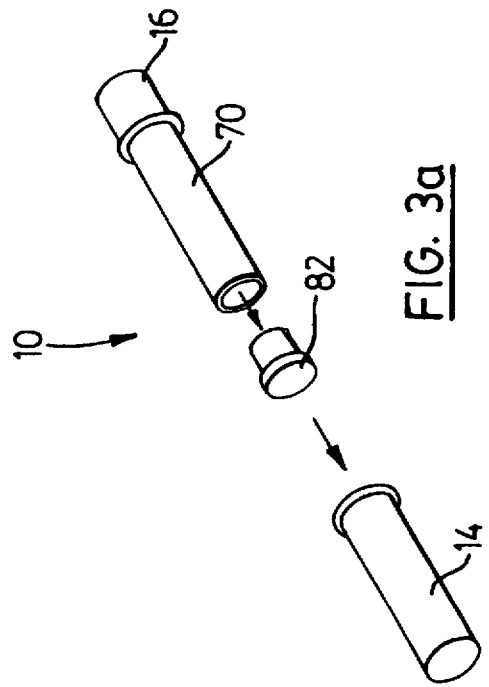
Figure 4:
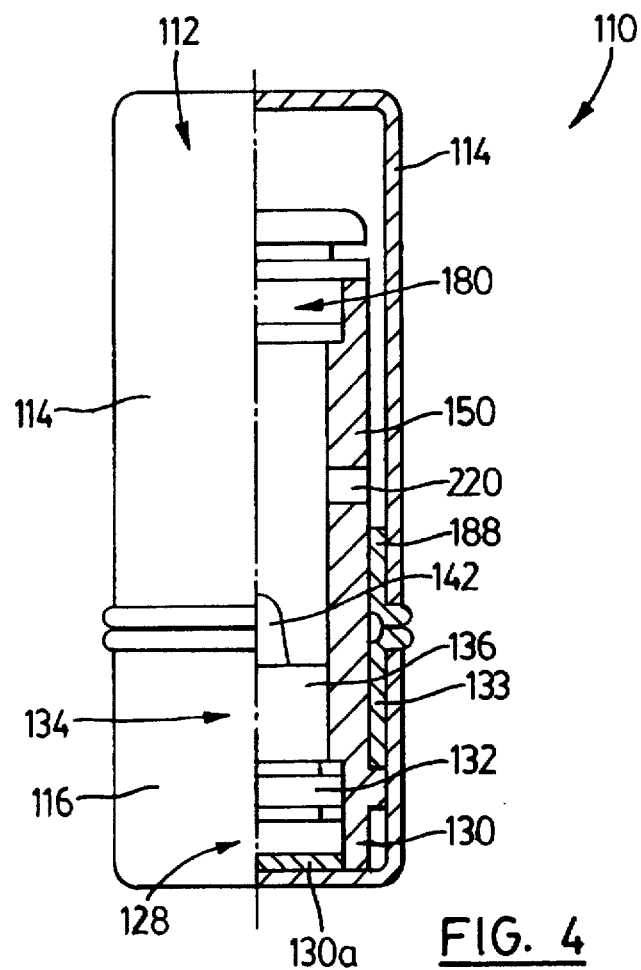
Figure 5:
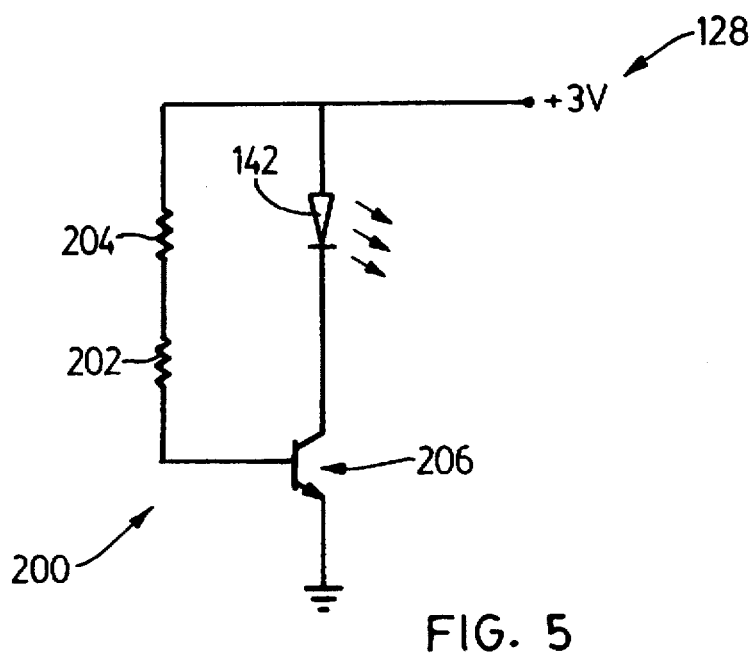

FIG. 2 is a side elevational view of a portion of the biological sample testing device of FIG. 1;

FIGS. 3a to 3c are perspective views illustrating the use of the biological sample testing device of FIG. 1;

FIG. 4 is a is a side elevational view, partly cut-away, of a biological sample testing device in accordance with another embodiment of the present invention; and FIG. 5 is a schematic circuit diagram of a light control circuit forming part of the biological sample testing device of FIG. 4.

DETAILED DESCRIPTION OF THE PREFERRED EMBODIMENT

Referring now to FIGS. 1 and 2, a portable biological sample testing device in accordance with the present invention is shown and is generally indicated to by reference numeral 10. The biological sample testing device 10 is designed to allow users to perform self-examinations of desired biological samples easily and without incurring great expense. The biological sample testing device 10 includes a generally cylindrical, hollow outer casing 12 constituted by separable upper and lower shell members 14 and 16 respectively. The casing 12 is dimensioned to facilitate carrying and in the preferred embodiment is similar in size to a tube of lipstick.

Within the lower shell member 16 and seated near its base is a power supply 28 which includes a battery holder 30 and a pair of batteries 32 accommodated by the holder. A cap 30a threadably engages the holder 30 to retain the batteries 32. A retaining sleeve 33 is positioned above the holder 30 and forms a friction fit with the shell member 16. In order to replace the batteries 32, the lower shell member 16 is removed from the retaining sleeve 33 and the cap 30a is rotated to separate it from the holder 30. Old batteries are removed and replaced with new batteries. The cap 30a is then threaded back onto the holder 30 and the lower shell member 16 is pushed back over the retaining sleeve 33.

Above the power supply 28 is a light source 34. The light source 34 includes a generally cylindrical body 36 having a radially extending projection 40 thereon. A lamp 42 in the form of a light emitting diode (LED) is supported on the top of the body 36 and is electrically connected to contacts (not shown) on the body. The contacts establish an electrical connection between the power supply 28 and the lamp 42 to illuminate the lamp when the body 36 contacts the power supply 28.

Surrounding the light source 34 and seated on the power supply 28 is a generally cylindrical, stationary inner tube 50 having an annular flange 52 at one end. The annular flange 52 forms a friction fit with the retaining sleeve 33. A longitudinal slot 56 which narrows in width intermediate its opposed ends is provided in the inner tube 50 and accommodates the projection 40 on the body 36. The light source 34 is axially moveable within the inner tube 50 to allow the light source to be moved between an on condition where the light source is in electrical contact with the power supply 28 and an off position where the light source 34 is electrically isolated from the power supply 28. The co-operating projection 40 and slot 56 inhibit the light source 34 from rotating thereby restricting it to axial movement ensuring efficient electrical transmission. The other end of the inner tube 50 is stepped to define inner and outer annular abutment surfaces 56 and 58 respectively.

A generally cylindrical outer tube 60 having a spiral groove 62 formed in its interior surface to accommodate the projection 40 surrounds the inner tube 50. The outer tube 60 is rotatable about the inner tube 50 and extends between the upper surface of the annular flange 52 and the outer abutment surface 58. A tubular turn cap 70 abuts the annular flange 64 and surrounds the outer tube 60. The turn cap 70 is fixedly secured to and rotatable with the outer tube 60. A lens system 80 is pressed into the top of the inner tube 50 and includes a lens holder 81 removably receiving a lens 82. The lens holder 81 includes a cylindrical portion 84 extending into the inner tube 50 which abuts annular surface 56. An annular flange 84 is provided on the cylindrical portion 84 and overlies the inner tube 50 and turn cap 70. The lens holder 81 and lens 82 include co-operating precision spiral threads to allow the lens 82 to rotate and move axially with respect to the lens holder 81 to allow the focus of the lens system 80 to be adjusted. A friction sleeve 88 is secured to the turn cap 70 and forms a friction fit with the shell member 14.

The operation of the biological sample testing device will now be described with reference to FIGS. 1 to 3c. In use, the upper shell member 14 is separated from the lower shell member 16 by pulling it axially away from the lower shell member 16 thereby exposing the turn cap 70, lens 82 and lens holder 81. The lens 82 is rotated with respect to the lens holder 81 until they separate and the biological sample to be examined is spread on the inner surface of the lens 82 which defines a support surface 90 for the biological sample (see FIG. 3b). The lens 82 and lens holder 81 are then re-engaged by threading the lens 82 back onto the lens holder 81.

At this point, the turn cap 70 is rotated causing the outer tube 60 to rotate about the inner tube 50. As the outer tube 60 rotates, the projection 40 follows the spiral groove 62 and the longitudinal slot 56 resulting in axial displacement of the light source 34 within the inner tube 50. The turn cap 70 is rotated until the light source 34 is moved axially a sufficient distance to bring it into electrical contact with the power supply 28. When the light source 34 contacts the power supply 28, the lamp 42 illuminates the biological sample allowing a user to examine the biological sample placed on the support surface 90 by looking into the lens 82 (see FIG. 3c). If desired, the user can adjust the focus of the lens 82 by axially adjusting the position of the lens within the lens holder 81.

Depending on the type of sample to be examined, different lenses 82 can be used with the biological sample testing device 10. Thus, the biological sample testing device can be used to examine a variety of biological samples such as for example blood, saliva to test for ovulation in women, cell shapes in urine, parasites in stool, plant specimens and sperm quantity to name but a few.

Although the projection 40 has been shown on the body 36 of the light source 34 and the spiral groove 62 formed in the outer tube 60, it should be apparent to those of skill in the art that the projection can be provided on the outer tube and the spiral groove can be provided in the light source body 36.

Referring now to FIGS. 4 and 5, another embodiment of a biological sample testing device is shown and is generally indicated to by reference numeral 110. In this embodiment, like reference numerals will be used to identify like components of the previous embodiment with a "100" added for clarity. The biological sample testing device 110 includes a casing 112 constituted by separable upper and lower shell members 114 and 116 respectively. Within the casing 112 is a generally cylindrical stationary inner tube 150. One end of the inner tube accommodates a power supply 128. In particular, the one end of the inner tube is configured to define a battery holder 130 accommodating a pair of batteries 132. A cap 130a is threaded onto the end of the inner tube 150 to retain the batteries. A stationary light source 134 is positioned within the inner tube 150 and is in electrical contact with the batteries 132 by way of a light control switching circuit 200 as will be described. The light source 134 includes a generally cylindrical body 136 and a lamp 142 in the form of a light emitting diode (LED) on the top of the body 136. A lens system 180 identical to that of the previous embodiment is positioned at the other end of the inner tube 150. Retaining sleeves 133 and 188 respectively surround the inner tube 150 and form friction fits with the upper and lower shell members 114 and 116.

Provided on the surface of the inner tube 150 is a light-sensitive resistor 202. The light-sensitive resistor 202 has one terminal electrically connected to one terminal of a resistor 204 and a second terminal electrically connected to the base of a transistor 206. The resistor 204 and transistor 206 form part of the light source 134 and are accommodated by the body 136. The second terminal of resistor 204 is electrically connected to the power supply 128. The emitter of the transistor 206 is connected to ground while the collector of the transistor 206 is connected to a terminal of the lamp 142. The other terminal of the lamp 142 is electrically connected to the power supply 128.

In this embodiment, the light source 134 does not have to be moved in order to connect it electrically to the power supply 128. Rather, the light control switching circuit 200 is used to illuminate the lamp 142 when the shell member 114 is separated from the biological sample testing device 110. Specifically, when the shell member 114 is removed from the biological sample testing device, the resistivity of the light-sensitive resistor 202 changes. This change in resistivity results in a sufficient bias being applied to the base of the transistor 206 to turn the transistor on. With the transistor on, current flows from the power supply 128 through the lamp 142 to ground causing the lamp 142 to illuminate. When the shell member 114 is replaced, the resistivity of the light-sensitive resistor 202 changes again removing the bias from the base of the transistor 206 causing the transistor to turn off. This in turn isolates the lamp 142 from the power supply 128 causing the lamp to turn off.

As will be appreciated by those of skill in the art, the present invention provides advantages in that the biological sample testing device is reliable and easy to operate, easy and convenient to carry and inexpensive to manufacture while allowing a variety of different biological samples to be examined. Although particular embodiments of the present invention have been described, those of skill in the art will appreciate that variations and modifications may be made to the present invention without departing from the spirit and scope thereof as defined by the appended claims.

We claim:

1. A portable testing device for examining biological samples comprising:

a support;

a first tubular member having a lens holder adjacent one end thereof;

a light source within said first tubular member and actuable between on and off conditions;

a power supply for said light source;

a biological sample support surface within said first tubular member on which a biological sample to be examined is placed; and a lens removably supported by said lens holder through which a user can look to examine a biological sample placed on said biological sample support surface wherein said first tubular member is rotatably mounted on said support and wherein said light source is movable axially within said first tubular member between said on and off conditions, said light source and first tubular member carrying co-operating formations configured to move axially said light source upon rotation of said first tubular member.

2. A testing device as defined in claim 1 wherein said co-operating formations are in the form of a spiral groove formed in one of said first tubular member and light source and a projection on the other of said first tubular member and light source.

3. A testing device as defined in claim 2 wherein said spiral groove is formed in an inner surface of said first tubular member.

4. A testing device as defined in claim 3 further comprising a stationary second tubular member coaxial with said first tubular member and disposed between said light source and said first tubular member, said second tubular member being fixed to said support and having a longitudinal slot therein through which said projection passes, said light source being moveable axially within said second tubular member, said first tubular member being rotatable about said second tubular member.

5. A testing device as defined in claim 4 further comprising a generally cylindrical turn cap surrounding said first tubular member and being fixedly secured thereto.

6. A testing device as defined in claim 5 wherein said slot narrows in width intermediate its opposed ends.

7. A testing device as defined in claim 4 wherein said support accommodates said power supply adjacent one end of said second tubular member, said light source being brought into electrical contact with said power supply in said on condition and being electrically isolated from said power supply in said off condition.

8. A testing device as defined in claim 7 further including an outer casing constituted by a pair of separable shell members and forming an enclosure for said testing device.

9. A testing device as defined in claim 2 wherein said lens is axially adjustable within said lens holder to adjust the focus thereof.

10. A testing device as defined in claim 9 wherein said biological sample support surface is constituted by a surface of said lens.

11. A portable testing device for examining biological samples comprising:

an outer enclosed casing constituted by a pair of separable shell members;

a stationary inner tubular member within said casing and having a longitudinally extending slot therein;

a power supply adjacent one end of said inner tubular member;

a lens holder adjacent an opposite end of said inner tubular member;

an outer tubular member surrounding said inner tubular member, said outer tubular member being rotatable with respect to said inner tubular member;

a light source moveable axially within said inner tubular member between an illuminated on position where said light source is in electrical contact with said power supply and an off position where said light source is electrically isolated from said power supply;

a biological sample support surface on which a biological sample to be examined is placed; and a lens removably supported by said lens holder through which a user can look to examine a biological sample placed on said biological sample support surface, wherein one of said light source and outer tubular member carries a projection extending through said slot and the other of said light source and outer tubular member carries a spiral groove therein accommodating said projection, said projection being moveable along said groove and slot to move axially said light source within said inner tubular member upon rotation of said outer tubular member.

12. A testing device as defined in claim 11 wherein said outer casing is generally cylindrical.

13. A testing device as defined in claim 12 wherein said spiral groove is formed in an inner surface of said outer tubular member.

14. A testing device as defined in claim 13 further comprising a generally cylindrical turn cap surrounding said outer tubular member and being fixedly secured thereto.

15. A testing device as defined in claim 14 wherein said slot narrows in width intermediate its opposed ends.

16. A testing device as defined in claim 15 wherein said lens is axially adjustable within said lens holder to adjust the focus thereof.

17. A testing device as defined in claim 16 wherein said biological sample supporting surface is constituted by an interior surface of said lens.

18. A portable testing device for examining biological samples comprising:

an outer enclosed casing constituted by a pair of separable shell members;

an inner tubular member within said casing;

a power supply;

a lens holder adjacent one end of said inner tubular member;

a light source within said inner tubular member and actuable between an illuminated on position where said light source is electrically connected to said power supply and an off position where said light source is electrically isolated from said power supply;

a light-sensitive circuit to actuate said light source between said on and off conditions;

a biological sample support surface on which a biological sample to be examined is placed; and a lens removably supported by said lens holder through which a user can look to examine a biological sample placed on said biological sample support surface.

19. A testing device as defined in claim 18 wherein light-sensitive circuit includes a light-sensitive resistor on said inner tubular member, said light source including a switch responsive to said light-sensitive resistor and acting electrically between said light source and said power supply.

20. A testing device as defined in claim 19 wherein said switch is in the form of a transistor and wherein said light source is in the form of a light emitting diode.

21. A testing device as defined in claim 18 wherein said lens is axially adjustable within said lens holder to adjust the focus of said testing device.

22. A testing device as defined in claim 21 wherein said biological sample support surface is constituted by a surface of said lens.

* * * * *